(12) United States Patent
Shen et al.

(10) Patent No.: US 6,391,092 B1
(45) Date of Patent: May 21, 2002

(54) THERMAL SWING ADSORPTION PROCESS FOR THE REMOVAL OF DINITROGEN OXIDE, HYDROCARBONS AND OTHER TRACE IMPURITIES FROM AIR

(75) Inventors: Dongmin Shen, Berkeley Heights; Madhusudhan Huggahalli, Somerset; Martin Bülow, Basking Ridge; Sudhakar R. Jale, Scotch Plains, all of NJ (US); Ravi Kumar, Allentown, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/416,036

(22) Filed: Oct. 12, 1999

(51) Int. Cl.⁷ .......................... B01D 53/04; B01D 53/26
(52) U.S. Cl. ............................ 95/120; 95/129; 95/139; 95/144; 95/902
(58) Field of Search .................... 95/114, 115, 117–121, 95/128, 129, 143, 144, 902

(56) References Cited

U.S. PATENT DOCUMENTS

| | | | |
|---|---|---|---|
| 4,249,915 A | 2/1981 | Sircar et al. .................... 55/26 |
| 4,507,271 A | 3/1985 | Van Deyck et al. ......... 423/387 |
| 4,711,645 A | 12/1987 | Kumar .......................... 55/26 |
| 5,171,553 A | 12/1992 | Li et al. ...................... 423/239 |
| 5,232,474 A | 8/1993 | Jain ............................... 55/26 |
| 5,407,652 A | 4/1995 | Swamy et al. ........... 423/239.1 |
| 5,454,857 A | * 10/1995 | Chao ........................ 95/902 X |
| 5,472,677 A | 12/1995 | Farris et al. ............. 423/239.1 |
| 5,531,808 A | * 7/1996 | Ojo et al. .................. 95/902 X |
| 5,562,888 A | 10/1996 | Rajadurai ................. 423/239.1 |
| 5,656,066 A | * 8/1997 | Reiss et al. ................ 95/902 X |
| 5,779,767 A | * 7/1998 | Golden et al. ............ 95/129 X |
| 5,914,455 A | * 6/1999 | Jain et al. .................. 95/129 X |
| 5,919,286 A | * 7/1999 | Golden et al. ............ 95/129 X |
| 6,106,593 A | * 8/2000 | Golden et al. ............ 95/129 X |

FOREIGN PATENT DOCUMENTS

| | | | |
|---|---|---|---|
| DE | 045 451 | 12/1888 | |
| DE | 32 44 370 A | * 6/1984 | .................. 95/129 |
| EP | 0 449 576 A1 | 10/1991 | |
| EP | 0 862 938 A1 | 9/1998 | |
| EP | 0 930 089 A1 | 7/1999 | |
| GB | 1 586 961 | 3/1981 | |

OTHER PUBLICATIONS

U. Wenning, "Nitrous Oxide In Air Separation Plants", Must '98, Linde AG, 1996, pps. 79–91.

F. Mayinger & R. Eggert–Steger, "Experimental and Theoretical Investigations Concerning Coadsorption of $CO_2$ and $N_2O$ on Molecular Sieve 5 A", Journal of Energy, Heat & Mass Transfer, vol. 15, 165–177 (1993).

* cited by examiner

*Primary Examiner*—Robert H. Spitzer
(74) *Attorney, Agent, or Firm*—Philip H. Von Neida; Salvatore P. Pace

(57) ABSTRACT

The present invention provides for a process for purifying atmospheric air prior to its separation by cryogenic distillation. The process utilizes three adsorbent layers, the first primarily removes water; the second primarily removes $CO_2$; and the third layer is designed to remove displaced gas components such as $N_2O$ and hydrocarbons which are displaced by the second layer. It has been found that CaX type adsorbents provide the removal of $N_2O$ and hydrocarbons in the third layer.

12 Claims, 2 Drawing Sheets

THERMAL SWING ADSORPTION PROCESS FOR THE REMOVAL OF DINITROGEN OXIDE, HYDROCARBONS AND OTHER TRACE IMPURITIES FROM AIR

BACKGROUND OF THE INVENTION

The present invention is directed to a novel thermal swing adsorption process, TSA, for removal of trace impurities such as dinitrogen oxide, $N_2O$, and hydrocarbons from air, and to the adsorbent composition for this process. In particular, the present invention is directed to a TSA process for use in pre-purification units, PPU, prior to cryogenic separation of oxygen and nitrogen from air.

Prior to cryogenic separation of oxygen and nitrogen from air, various trace impurities must be removed to avoid formation of solids in the heat exchanger equipment and resultant high pressure and safety issues in the cryogenic process. The most obvious trace air impurities that must be removed include carbon dioxide, $CO_2$, and water, $H_2O$. There are many references which disclose the use of pressure swing adsorption, PSA, and TSA to remove these types of impurities from air in pre-purification units prior to cryogenic separation of oxygen and nitrogen from air. For example, see German Patent Application 045,451; U.S. Pat. No. 4,711,645; U.S. Pat. No. 4,249,915; U.S. Pat. No. 5,232,474; Great Britain Patent 1,586,961 and EPO Patent Application 0 449 576. In addition, the recently published EPO Patent Application 0 862 938 discloses a PSA process for the removal of nitrogen oxides in addition to carbon dioxide and water from gases prior to cryogenic processing in air separation units, ASU. Finally, the recently published EPO Patent Application 0 930 089 discloses a TSA process for removal of $CO_2$ from air using various zeolite adsorbents.

The importance of the removal of nitrogen oxides from air prior to entering into a cryogenic air separation plant has only recently been recognized. The removal of $N_2O$ is particularly important because of its increase in concentration in the atmosphere. It is well known that $N_2O$ is a greenhouse gas and the concentration of $N_2O$ in the atmosphere (currently about 0.3 ppm) has been increasing steadily (by about 0.2 to 0.3% annually). This increase is mainly caused by anthropogenic activities as well as by emissions from various chemical processes. An excess of $N_2O$ in cryogenic air separation units may lead to tube plugging in heat exchangers and contamination of the products. The fact that $N_2O$ is very stable in air and its atmospheric lifetime comprises of about 150 years makes the removal of $N_2O$ in an air pre-purification unit absolutely essential in both present time and the future. It is envisioned that in the future the removal of $N_2O$ will become as important as the removal of water and $CO_2$. As the concentration of $N_2O$ in air increases further, the current regime of PPU processes will become inadequate because $N_2O$ cannot be removed easily by existing PPU processes. Accordingly, there is a clear need to develop an approved adsorption process suitable for use in PPU units to remove not only water and $CO_2$ but also the trace amounts of nitrogen oxides, in particular $N_2O$, which are present in the air being sent to the cryogenic separation unit. In addition, great care should be taken for the removal of hydrocarbons, such as low-molecular weight hydrocarbon gases, methane, ethane, propane, n-butane, iso-butane as well as any non-saturated species, such as acetylene, ethylene, propylene, the n-butylene isomers and the iso-butylene isomers, from air in PPU processes. It is also important that both hydrocarbons and plugging components such as $N_2O$ and $CO_2$ be simultaneously removed in the air pre-purification process. Deposits of plugging components may create an opportunity for hydrocarbons to collect and concentrate in these deposits. The present invention is directed to such a solution which aims, in particular, to a simultaneous, highly effective pre-purification of air.

SUMMARY OF THE INVENTION

It is the primary object of the present invention to provide a novel temperature swing adsorption process for use in air pre-purification units.

It is another object of the present invention to provide a novel temperature swing adsorption process which removes trace impurities of nitrogen oxides, especially of dinitrogen oxide, from air.

It is a further object of the present invention to provide a novel temperature swing adsorption process which removes trace hydrocarbons from air prior to entering into a cryogenic distillation unit for separation of oxygen and nitrogen from air.

Additional objectives and advantages of the invention will be set forth in part at the end of the description which follows and in part will be obvious from the description or may be learned by practice of the invention. The objectives and advantages of the invention may be realized and attained by means of the processes and combinations particularly pointed out in the appended claims.

To achieve the foregoing objects and in accordance with the purpose of the present invention as embodied and described herein, the gas separation process of the present invention comprises passing a gas stream containing impurities comprising water, carbon dioxide, dinitrogen oxide, and hydrocarbons into a temperature swing adsorption unit when the gas stream is passed through a first adsorbent capable of removing the water from a gas stream, then through a second adsorbent comprising a sodium X-type zeolite wherein the Si/Al elemental ratio of the zeolitic phase ranges between from about 0.9 to 1.3 to remove the $CO_2$ impurity from the gas stream, and then passing the gas stream through a third adsorbent comprising a X-type zeolite having a Si/Al elemental ratio of the zeolitic phase, ranging from about 0.9 to 1.3, whose exchangeable cations on an equivalent basis include about 0 to about 100% calcium ions, and about 100 to about 0% other ions, the other ions being selected from the group consisting of Group IA ions such as lithium, sodium and potassium, from Group IIA ions other than calcium, from Group IB ions other than gold, from Group IIB ions other than mercury, and from ions of the lanthanides, and mixtures of these, to remove the dinitrogen oxide and hydrocarbon impurities from the gas stream.

In a preferred embodiment of the present invention, the TSA process is provided in an air pre-purification unit prior to entry of the gas stream into the cryogenic air separation process.

In a further preferred embodiment of the present invention, the first adsorbent layer is Activated Alumina.

In a still further preferred embodiment of the present invention, the second adsorbent layer is a sodium Low-Silicon-X zeolite (NaLSX zeolite), wherein the Si/Al elemental ratio of the zeolitic phase ranges between 0.9 and 1.15.

In a still further preferred embodiment of the present invention, the third adsorbent layer is a LSX zeolite wherein the Si/Al elemental ratio of the zeolitic phase ranges between 0.9 and 1.15, whose exchangeable cations on an equivalent basis include about 60 to about 100% calcium ions, and about 40 to about 0% other ions, the other ions being selected from the group consisting of Group IA ions such as lithium, sodium and potassium, from Group IIA ions other than calcium, from Group IB ions other than gold, from Group IIB ions other than mercury, and from ions of the lanthanides, and mixtures of these.

In a most preferred embodiment of the present invention both the second and the third adsorbent layer comprise the sodium cation exchanged form of LSX type and the calcium cation exchanged form of the X-type zeolite, respectively, wherein the Si/Al elemental ratio of the zeolitic phases ranges from 0.95 to 1.05, and the cation composition of the third adsorbent comprises from about 95 to about 100% of calcium ions and about 5 to about 0% of cations being selected from the group consisting of Group IA such as lithium, sodium and potassium, from Group IIA ions other than calcium, from Group IB ions other than gold, from Group IIB ions other than mercury, and from ions of the lanthanides, and mixtures of these.

It is understood that the zeolite adsorbents of this invention are used in the form of shaped particles also known as secondary particles. These secondary particles may be shaped by a series of methods into various geometrical forms such as, for example, beads, extrudates, etc. Beading, extruding and other shaping methods utilize inorganic materials as binders added to the zeolitic crystalline phase prior to the shaping process. These binders allow for necessary mechanical strength of the particles and creation of a macropore system in the interior of the latter ones needed for effective sorption performance properties. The binder content may vary widely depending on the type of binder materials used, i.e., between about 5 and 25 weight % of the final product. Chemical composition of binders has not been taken into account where, in this invention, Si/Al elemental ratios are referred to. For this particular reason, the expression "Si/Al elemental ratio of the zeolitic phase" is being used throughout. Binder types and shaping procedures as far as the adsorbent materials of the current invention are concerned, represent well-known art and do not represent a part of the present invention.

Typically, regeneration is carried out at a temperature sufficiently higher than the adsorption temperature of the process. Typical regeneration temperatures are in the range of 50 to about 300° C., preferably between the range of 100 to 250° C.

The novel TSA procedure of the present invention is directed to the use of the class of zeolitic adsorbent materials which have been identified as not only suitable for the removal of nitrogen oxides, in particular dinitrogen oxide, $N_2O$, but also of hydrocarbons from air. For this purpose, the novel adsorbent class comprises X-type zeolite with a Si/Al elemental ratio of the zeolitic phase that ranges from 0.9 to 1.3, whose exchangeable cations on an equivalent basis include about 0 to about 100% calcium ions, and about 100 to about 0% other ions, the other ions being selected from the group consisting of Group IA ions such as lithium, sodium and potassium, from Group IIA ions other than calcium, from Group IB ions other than gold, from Group IIB ions other than mercury, and from ions of the lanthanides, and mixtures of these, preferably, however, from 0.9 to 1.15, and a cation composition of this adsorbent comprises from about 60 to about 100% of calcium ions and about 40 to about 0% of cations being selected from the Group IA such as lithium, sodium and potassium, from Group IIA ions others than calcium, from Group IB ions others than gold, from Group IIB ions others mercury, and from ions of the lanthanides, and mixtures of these, and especially preferred between 0.95 and 1.05, and a cation composition that comprises from about 95 to about 100% of calcium ions and about 5 to about 0% of cations being selected from the group consisting of Group IA ions such as lithium, sodium and potassium, from Group IIA ions other than calcium, from Group IB ions other than gold, from Group IIB ions other than mercury, and from ions of the lanthanides, and mixtures of these. The materials with a Si/Al elemental ratio from 0.9 to 1.15, and the described cation compositions will here and further on be named as calcium Low-Silicon X-type zeolite (CaLSX type zeolite).

The advantage of the present invention resides in its relative simplicity. It has been discovered that by the use of a third adsorbent layer comprising CaLSX type zeolite that one can simply convert a temperature swing adsorption PPU unit into a unit which not only removes water and carbon dioxide from gas streams prior to entry into the cryogenic air separation unit, but also removes the undesirable nitrogen oxides, especially dinitrogen oxide, and saturated as well as non-saturated hydrocarbon gases present in the air stream. This leads to an air stream entering the cryogenic distillation unit which is substantially free of trace impurities such as water, carbon dioxide and also nitrogen oxides as well as hydrocarbons. This resultant highly purified air stream entering the cryogenic air separation unit results in a much safer plant and enables the air separation unit to give products which have an even higher purity than that previously attained.

It is envisaged that CaX-type zeolites in the ranges of Si/Al ratio and cation compositions of this invention may also be utilized for trace removal such as removal of $N_2O$ and saturated and unsaturated hydrocarbon gases from air in multi-layer pressure swing adsorption PPU systems, and/or in combined temperature swing/pressure swing adsorption systems.

A description of the present invention will now be set forth in detail.

DETAILED DESCRIPTION OF THE INVENTION

Figure 1:
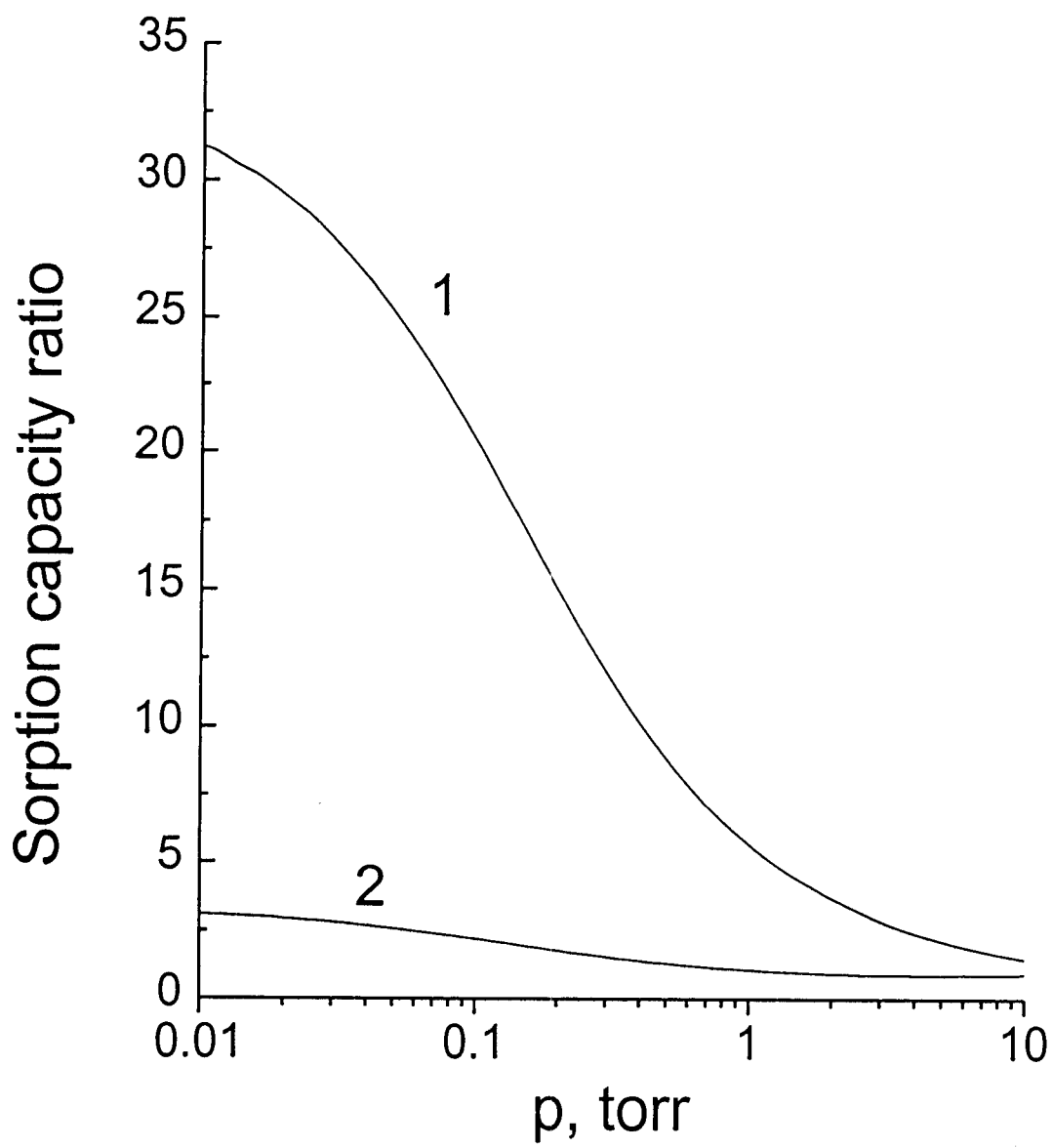
FIG. 1 is a graphical representation of sorption capacity ratio versus pressure for the $N_2O$/CaLSX system over the $N_2O$/NaLSX system for curve 1, and the $N_2O$/CaLSX system over the $CO_2$/NaLSX system for curve 2 (Example 2).
Figure 2:
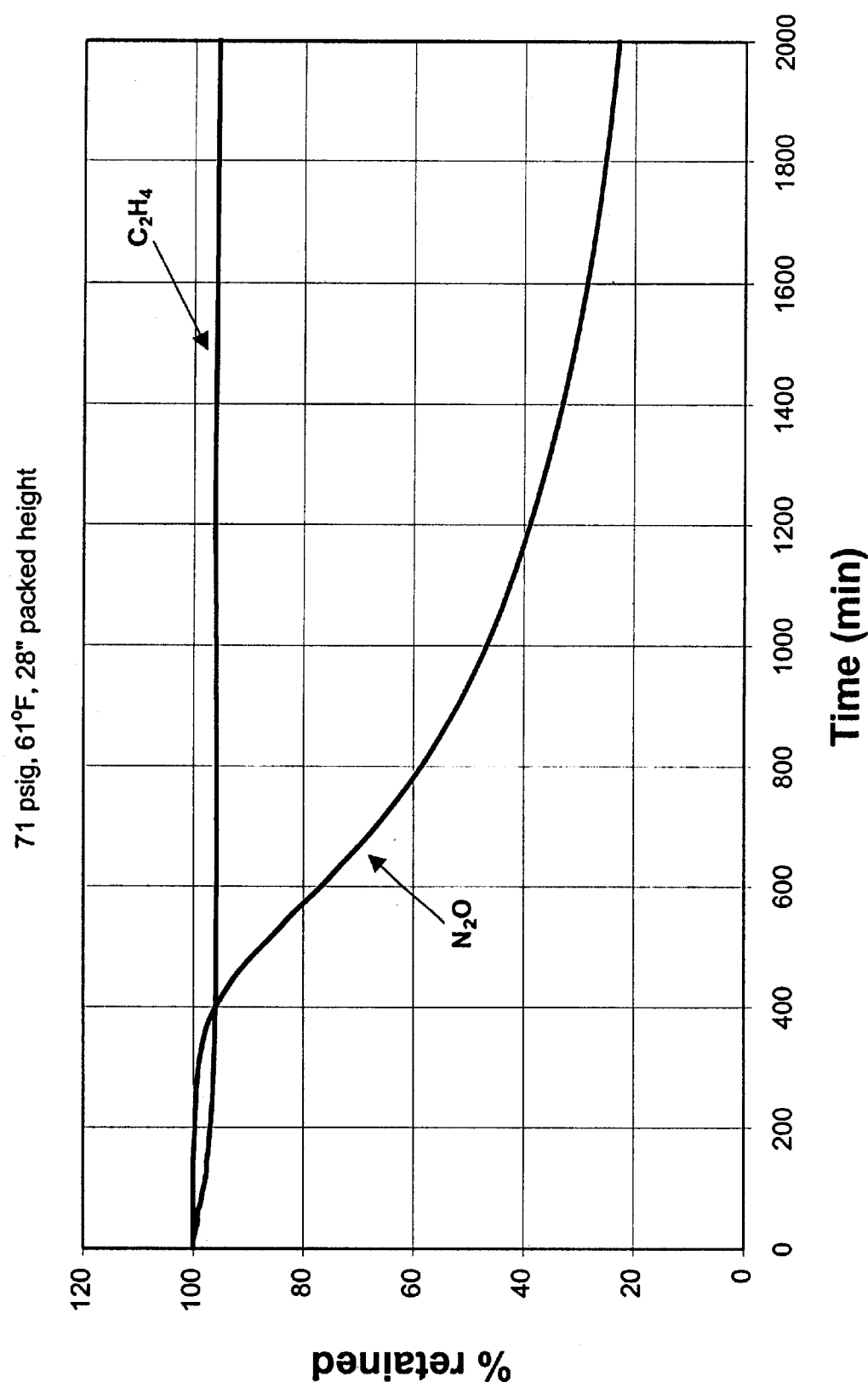
FIG. 2 is a graphical representation of percent (%) retained of two impurities, $C_2H_4$ and $N_2O$, versus time for a 28 inch bed packed with CaLSX type zeolite adsorbent as described in Example 3.

The present invention is directed to a novel process and adsorbent arrangement suitable for use in purifying atmospheric air by temperature swing adsorption (TSA) prior to the separation of nitrogen and oxygen from air by cryogenic distillation.

Typically, the feed to a cryogenic air separation unit comprises atmospheric air containing $H_2O$ vapor, $CO_2$ and trace impurities including $N_2O$, acetylene, propane and other hydrocarbons. This feed is normally passed through a TSA pre-purification unit (PPU) to remove the $H_2O$ and $CO_2$. Current TSA-PPU designs while suitable for the removal of $H_2O$ and $CO_2$ from air are not adequate for the removal of the trace impurities such as various nitrogen oxides and/or hydrocarbons. The process of the present invention is directed to a novel adsorbent arrangement for use in a TSA-PPU which not only removes $H_2O$ and $CO_2$ from the air feed but also removes substantially all the nitrogen oxides, in particular $N_2O$, and hydrocarbons, in particular $C_2H_4$, from the air feed prior to entry of the air feed into the ASU for the separation of $N_2$ and $O_2$.

The process of the present invention comprises removing water, carbon dioxide, nitrogen oxides and hydrocarbons from a gas stream in a TSA process wherein the gas stream is passed through (1) a first adsorbent layer capable of removing the water from the gas stream such as Activated Alumina, (2) a second adsorbent layer comprising an X zeolite, (e.g., zeolite 13X) to remove the $CO_2$ from the gas stream and, finally, (3) a third adsorbent layer that comprises a X zeolite with a Si/Al elemental ratio of the zeolitic phase which ranges from 0.9 to 1.3, whose exchangeable cations on an equivalent basis include about 0 to about 100% calcium ions, and about 100 to about 0% other ions, the other ions being selected from the group consisting of Group IA ions such as lithium, sodium and potassium, from Group IIA ions other than calcium, from Group IB ions other than gold, from Group IIB ions other than mercury, and from ions of the lanthanides, and mixtures of these, to remove the nitrogen oxides and hydrocarbons from the gas stream.

In a preferred embodiment of the present invention the nitrogen oxide impurity being removed comprises dinitrogen oxide, $N_2O$.

In another preferred embodiment of the present invention the X zeolite selected for the second adsorbent layer comprises a NaX zeolite with a Si/Al elemental ratio of the zeolitic phase between 0.9 and 1.3, preferably 0.9 and 1.15, and especially being 0.95 to 1.05.

In a further preferred embodiment of the present invention the X type zeolite selected for the third adsorbent layer has a Si/Al elemental ratio of the zeolitic phase from 0.9 to 1.15, and a cation composition that ranges from about 60% to about 100% of calcium cations and about 40 to about 0% of cations being selected from the Group IA such as lithium, sodium, and potassium; from Group IIA cations other than calcium; from Group IB cations other than gold; from Group IIB cations other than mercury; and from cations of the lanthanides, and mixtures of these; and, especially preferred, between 0.95 and 1.05 and a cation composition that comprises from about 95 to about 100% of calcium ions and about 5 to about 0% of cations being selected from the group consisting of Group IA ions such as lithium, sodium and potassium, from Group IIA ions other than calcium, from Group IB ions other than gold, from Group IIB ions other than mercury, and from ions of the lanthanides, and mixtures of these.

In still another preferred embodiment of the present invention the gas stream is air.

In another preferred embodiment the TSA process of the present invention is performed in an air PPU connected upstream to a cryogenic air separation unit.

In the typical operation of the TSA process of the present invention air containing water, $CO_2$ and trace impurities comprising nitrogen oxides (e.g., $N_2O$, NO, etc.) and hydrocarbons (e.g., acetylene, propane, etc.) is passed into a PPU containing three separate layers of adsorbent material. The first layer which contacts the air stream comprises an adsorbent which removes substantially all of the water from the air. Typically, the first adsorbent may comprise Activated Alumina although other known water adsorbent sieve materials such as zeolite NaX_ may be utilized. The substantially water free air is then passed through a second adsorbent layer capable of removing substantially all of the $CO_2$ from the air stream. The second adsorbent layer comprises a zeolite X material, in particular a NaX-type zeolite where the Si/Al elemental ratio of the zeolitic phase ranges from 0.9 to 1.3. Finally, the air stream substantially free of $H_2O$ and $CO_2$ passes through a third adsorbent layer comprising a Ca X-type zeolite wherein the Si/Al elemental ratio of the zeolitic phase ranges from 0.9 to 1.3 to remove substantially all of the nitrogen oxides and hydrocarbons impurities from the air. The resulting air stream exiting the TSA-PPU may then be fed directly into a cryogenic air separation unit for separation of the oxygen and nitrogen.

EXAMPLE #1

Comparative Example

A feed air stream saturated with water and containing the following trace impurities was passed through a bed packed with 1.3 ft of Activated Alumina and 2 ft layer of a NaX type zeolite at pressure, P=71 psia, and temperature, T=61° F.:

$CO_2$=~400 ppm
$CH_4$=2.2 ppm
$N_2O$=0.3–0.35 ppm
$C_2H_2$=0.40–0.48 ppm
$C_2H_4$=1.4–1.6 ppm
$C_2H_6$=1.4 ppm
$C3H_6$=0.55–0.75 ppm
$C_3H_8$=1.5–1.6 ppm
n-$C_4H_{10}$=1.6–1.8 ppm Prior to $CO_2$ breakthrough from the adsorbent bed the following trace impurities completely break through in the sequence: $CH_4$, $C_2H_6$, $C_3H_8$, $N_2O$ and $C_2H_4$. This implies that these impurities will end up in the cryogenic plant in their entirety and this would cause an unsafe operation.

EXAMPLE #2

Sorption isotherms for systems $CO_2$/NaLSX, $N_2O$/NaLSX and $N_2O$/CaLSX (all beads with c. 12 wt. % of binder) for a temperature, T=298.15, were evaluated from sorption isosteres measured directly as concentration dependences, by means of an isosteric sorption technique with minimum dead volume the principle of which is described in the paper, D. Shen and M. Bülow, *Microporous and Mesoporous Materials*, 22 (1998) 237–249. The elemental Si/Al ratio of the CaLSX material amounted to 1.05, and its calcium cation exchange value was about 99%. These isotherms are shown in a half-logarithm scale, in FIG. 1 of this example. The half-logarithm scale is chosen to show more clearly the differences in sorption behaviour for the three systems, which are exhibited especially in their low-pressure isotherm regions. The specific sorption behaviour in these regions is responsible for trace removal in PPU processes. FIG. 1 teaches that at sorption equilibrium gas pressures, <0.5 torr, the sorption capacity of CaLSX for $N_2O$ exceeds significantly that of NaLSX for $CO_2$. The preferred sorption strength in the $N_2O$/CaLSX system, as compared with that feature for the two other systems holds for very broad temperature regions, especially within the region, (0 to 100)° C. This makes the CaLSX zeolite a preferred $N_2O$ selective sorbent to remove a few ppm $N_2O$ from air in front of ASUs.

EXAMPLE #3

A feed air stream saturated with water and containing the above mentioned trace impurities was passed through a bed packed with a 28 inch packed bed of a CaLSX type zeolite adsorbent, available as Siliporite G586, bead size 1.6 to 2.5 mm, from CECA of France, at pressure, P=71 psia, and temperature, T=61° F. Prior to $CO_2$ breaking through the adsorbent bed, the following trace impurities break completely through in the sequence: $CH_4$, $C_2H_6$, and $C_3H_8$. Most noteworthy is that neither $N_2O$ nor $C_2H_4$ break through the column prior to the $CO_2$ breakthrough. Since TSA-PPU bed design is based upon $CO_2$ breakthrough, this implies that nothing of these impurities will enter the cryogenic plant which results in a safe operation of these plants.

While the invention has been described in conjunction with the specific embodiment described above, it is evident that many variations, alterations and modifications will be apparent to those skilled in the art in light of the foregoing description. Accordingly, it is intended to embrace all such alteration, modification and variations that fall within the scope and spirit of the appended claims.

Having thus described the invention, what we claim is:

1. A process for the removal of impurities from a gas stream by thermal swing adsorption comprising sequentially passing said gas stream through a first adsorbent layer which will remove water from said gas stream, a second adsorbent layer comprising a sodium X zeolite thereby removing $CO_2$ from said gas stream, and a third adsorbent layer comprising a calcium Low Silicon X zeolite wherein the adsorbents in said second and third layers have a Si/Al elemental ratio of the zeolitic phase between 0.9 to 1.3, and 0.9 and 1.15, respectively, with a cation composition of the third layer adsorbent, on an equivalent basis, that comprises about 60 to about 100% calcium ions, and about 40 to about 0% other ions, the other ions being selected from the group consisting of Group IA ions, from Group IIA ions other than calcium, from Group IB ions other than gold, from Group IIB ions other than mercury, and from ions of the lanthanides, and mixtures of these, and said third layer adsorbent comprises about 5 to about 25 percent by weight of binder, thereby removing nitrogen oxides and hydrocarbons from said gas stream.

2. The process as claimed in claim 1 wherein said Group IA ions are selected from the group consisting of lithium, sodium and potassium.

3. The process as claimed in claim 1 wherein said first adsorbent layer is Activated Alumina.

4. The process as claimed in claim 1 wherein said sodium X zeolite is a sodium Low-Silicon X zeolite having a Si/Al elemental ratio of the zeolitic phase between 0.95 and 1.05.

5. The process as claimed in claim 1 wherein said third adsorbent layer has a Si/Al elemental ratio of the zeolitic phase between 0.95 and 1.05 and a cation composition that comprises from about 95 to about 100% of calcium ions and about 5 to about 0% of cations being selected from the group consisting of Group IA ions, from Group IIA ions other than calcium, from Group IB ions other than gold, from Group IIB ions other than mercury, and from ions of the lanthanides, and mixtures of these.

6. The process as claimed in claim 5 wherein said Group IA ions are selected from the group consisting of lithium, sodium and potassium.

7. The process as claimed in claim 1 wherein said gas stream comprises air.

8. The process as claimed in claim 1 wherein said nitrogen oxide is $N_2O$.

9. The process as claimed in claim 1 wherein said hydrocarbons are acetylene, ethylene, propylene, propane, n-butane, iso-butane, the n-butylene isomers and the various iso-butylene isomers.

10. The process as claimed in claim 1 wherein the temperature of the gas stream is about 5° to about 60° C.

11. The process as claimed in claim 1 wherein said thermal swing adsorption is part of an air pre-purification unit.

12. The process as claimed in claim 1 wherein the gas stream exiting said thermal swing adsorption process is fed directly into a cryogenic air separation unit.

* * * * *